US 9,794,107 B2

(12) United States Patent
Gaglianello et al.

(10) Patent No.: US 9,794,107 B2
(45) Date of Patent: Oct. 17, 2017

(54) METHOD AND APPARATUS FOR PROVIDING MIGRATION OF CLOUD COMPONENTS ACROSS ADDRESS DOMAINS

(71) Applicant: ALCATEL-LUCENT, Boulogne-Billancourt (FR)

(72) Inventors: Robert D. Gaglianello, Little Silver, NJ (US); Moritz M. Steiner, Montclair, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 854 days.

(21) Appl. No.: 13/760,287

(22) Filed: Feb. 6, 2013

(65) Prior Publication Data
US 2014/0223013 A1 Aug. 7, 2014

(51) Int. Cl.
H04L 29/08 (2006.01)
H04L 29/12 (2006.01)
G06F 9/48 (2006.01)

(52) U.S. Cl.
CPC ...... *H04L 29/08153* (2013.01); *G06F 9/4856* (2013.01); *H04L 61/2007* (2013.01); *H04L 61/2084* (2013.01)

(58) Field of Classification Search
CPC ............... H04L 29/08144; H04L 29/06; H04L 29/08072
USPC ....................................................... 709/226
See application file for complete search history.

(56) References Cited

U.S. PATENT DOCUMENTS

2010/0322255 A1* 12/2010 Hao et al. ...................... 370/398
2011/0090911 A1* 4/2011 Hao et al. ................ 370/395.53
2012/0137287 A1 5/2012 Pang et al.

OTHER PUBLICATIONS

Nick McKeown et al., OpenFlow: enabling innovation in campus networks, Apr. 2008, ACM SIGCOMM Computer Communication Review, vol. 38 Issue 2, pp. 69-74.*
Martin Casado et al., Ethane: taking control of the enterprise, Oct. 2007, ACM SIGCOMM Computer Communication Review, vol. 37 Issue 4, pp. 1-12.*
Fang Hao et al., Enhancing dynamic cloud-based services using network virtualization, Jan. 2010, ACM SIGCOMM Computer Communication Review, vol. 40 No. 1, pp. 37-44.*
Marcelo Nascimento et al., Virtual routers as a service: the RouteFlow approach leveraging software-defined networks, Jun. 2011, CFI 11 Proceedings of the 6th International Conference on Future Internet Technologies, pp. 34-37.*

(Continued)

*Primary Examiner* — Nicholas Taylor
*Assistant Examiner* — Chong G Kim
(74) *Attorney, Agent, or Firm* — Kramer & Amado, P.C.

(57) ABSTRACT

Various embodiments provide a method and apparatus for providing migration of cloud components across address domains without the overhead of sending traffic from prior sessions through an anchor. In particular, the networking control plane is decoupled from the packet forwarding data plane using a mobility enablement layer (MEL) that allows creating rules for forwarding elements (FEs) to forward traffic directed to an address within the proper address domain.

22 Claims, 4 Drawing Sheets

(56) References Cited

OTHER PUBLICATIONS

Cloudstack, "Apache CloudStack (Incubating): Open Source Cloud Computing," available on-line at http://incubator.apache.org/cloudstack/, copyright 2012, The Apache Software Foundation, Licensed under the Apache License, Version 2.0. downloaded Mar. 14, 2013.

Michael Scharf et al., "Monitoring and Abstraction for Networked Clouds," in 2012 16th Int. Conf. Intelligence in Next Generation Networks: Realising the Power of the Network (ICIN 2012), 6 pages, Berlin, Germany, 2012 © IEEE.

Nick McKeown, "Software-defined Networking", Infocom, Apr. 2009, 64 pages.

OpenFlow Switch Specification, Version 1.1.0 Implemented (Wire Protocol 0x02), available on-line at http://openflow.org, Feb. 28, 2011, pp. 1-56.

Nick McKeown et al., "OpenFlow: Enabling Innovation in Campus Networks," available on-line at http://openflow.org, Mar. 14, 2008, 6 pages.

PCT Notification of Transmittal of the International Search Report and Written Report for PCT/US2014/014528, mailed Apr. 30, 2014.

Mehmet Vefa Bicakci et al: "TCP-Freeze: Beneficial for virtual machine live migration with IP address change?", Wireless Communications and Mobile Computing Conference (IWCMC), 2012 8th International, IEEE, Aug. 27, 2012, pp. 136-141.

\* cited by examiner

METHOD AND APPARATUS FOR PROVIDING MIGRATION OF CLOUD COMPONENTS ACROSS ADDRESS DOMAINS

TECHNICAL FIELD

The invention relates generally to methods and apparatus for providing migration of cloud components across address domains.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known cloud component migration solutions, a new IP address is assigned, however, for prior sessions the old IP address is maintained and the traffic is tunneled through an anchor at the old location to the newly assigned IP address.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections Various embodiments provide a method and apparatus for providing migration of cloud components across address domains without the overhead of sending traffic from prior sessions through an anchor. In particular, the networking control plane is decoupled from the packet forwarding data plane using a mobility enablement layer (MEL) that allows creating rules for forwarding elements (FEs) to forward traffic directed to an address within the proper address domain.

In a first embodiment, an apparatus is provided for migrating a cloud component from a first address domain to a second address domain. The apparatus includes a data storage and a processor communicatively connected to the data storage. The processor is programmed to: determine an occurrence of a migration event, the migration event indicating migration of the cloud component from the first address domain to the second address domain; determine a first address of the cloud component in the first address domain; determine a second address of the cloud component in the second address domain; determine a first forwarding rule for ingress traffic based on the first address and the second address; determine a second forwarding rule for egress traffic based on the first address and the second address; and direct a network controller to install the first and second forwarding rules.

In a second embodiment, a system is provided for migrating a cloud component from a first address domain to a second address domain. The system includes: a cloud management system; a MEL controller communicatively connected to the cloud management system; and a network controller communicatively connected to the MEL controller. The cloud management system is configured to: determine a migration event, the migration event comprising a determination to migrate the cloud component from the first address domain to the second address domain; and notify the MEL controller of the migration event. The MEL controller is configured to: determine an occurrence of the migration event; determine a first address of the cloud component in the first address domain; determine a second address of the cloud component in the second address domain; determine a first forwarding rule for ingress traffic based on the first address and the second address; determine a second forwarding rule for egress traffic based on the first address and the second address; and direct a network controller to install the first and second forwarding rules. The network controller is configured to: update flow tables in a plurality of edge FEs based on the first forwarding rule and the second forwarding rule.

In a third embodiment, a method is provided for migrating a cloud component from a first address domain to a second address domain. The method includes: determining a migration event, the migration event indicating migration of the cloud component from the first address domain to the second address domain; determining a first address of the cloud component in the first address domain; determining a second address of the cloud component in the second address domain; determining a first forwarding rule for ingress traffic based on the first address and the second address; determining a second forwarding rule for egress traffic based on the first address and the second address; and directing a network controller to install the first and second forwarding rules.

In a fourth embodiment, a computer-readable storage medium is provided for storing instructions which, when executed by a computer, cause the computer to perform a method. The method includes: determining a migration event, the migration event indicating migration of the cloud component from the first address domain to the second address domain; determining a first address of the cloud component in the first address domain; determining a second address of the cloud component in the second address domain; determining a first forwarding rule for ingress traffic based on the first address and the second address; determining a second forwarding rule for egress traffic based on the first address and the second address; and directing a network controller to install the first and second forwarding rules.

In some of the above embodiments, the first and second address domain are IP subnets.

In some of the above embodiments, the cloud component comprises at least one of an application, a virtual machine or a user endpoint.

In some of the above embodiments, the first forwarding rule specifies rewriting the destination IP address with the second address when a matching condition is met.

In some of the above embodiments, the second forwarding rule specifies rewriting the source IP address with the first address when a matching condition is met.

In some of the above embodiments, the determination of the second address comprises programming the processor to: retrieve the second address from an external source.

In some of the above embodiments, the processor is further programmed to: store at least a portion of the first forwarding rule and at least a portion of the second forwarding rule in a storage accessible to the network controller.

In some of the above embodiments, the system further includes: the plurality of edge FEs communicatively connected to the network controller. Wherein at least a subset of the plurality of edge FEs are configured to remove the corresponding flow table updates.

In some of the above embodiments, the plurality of edge FEs are edge components in a network, the networking being at least one of an enterprise network or a carrier network.

In some of the above embodiments, the network is a software defined network and the network controller controls the networking control plane and the plurality of edge FEs control the packet forwarding data plane.

In some of the above embodiments, the network controller is an OpenFlow controller.

In some of the above embodiments, the determination of the migration event is based on at least one of: a proximity of a client accessing the cloud component or a determined cost factor.

In some of the above embodiments, the cloud management system is further configured to notify the network controller to modify one or more of the first and second forwarding rules.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, the various embodiments described herein are not necessarily mutually exclusive, as some embodiments may be combined with one or more other embodiments to form new embodiments.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Various embodiments provide a method and apparatus for providing migration of cloud components across address domains without the overhead of sending traffic from prior sessions through an anchor. In particular, the networking control plane is decoupled from the packet forwarding data plane using a mobility enablement layer (MEL) that allows creating rules for forwarding elements (FEs) to forward traffic directed to an address within the proper address domain. Advantageously, by decoupling the networking control plane from the packet forwarding data plane, Service Providers (SP) may offer their customers an increased degree of mobility that allows for movement of both active applications and user's end-points across IP subnets. This will also enable the service providers improved control over where applications execute within the SP's network and data center locations.

Figure 1:
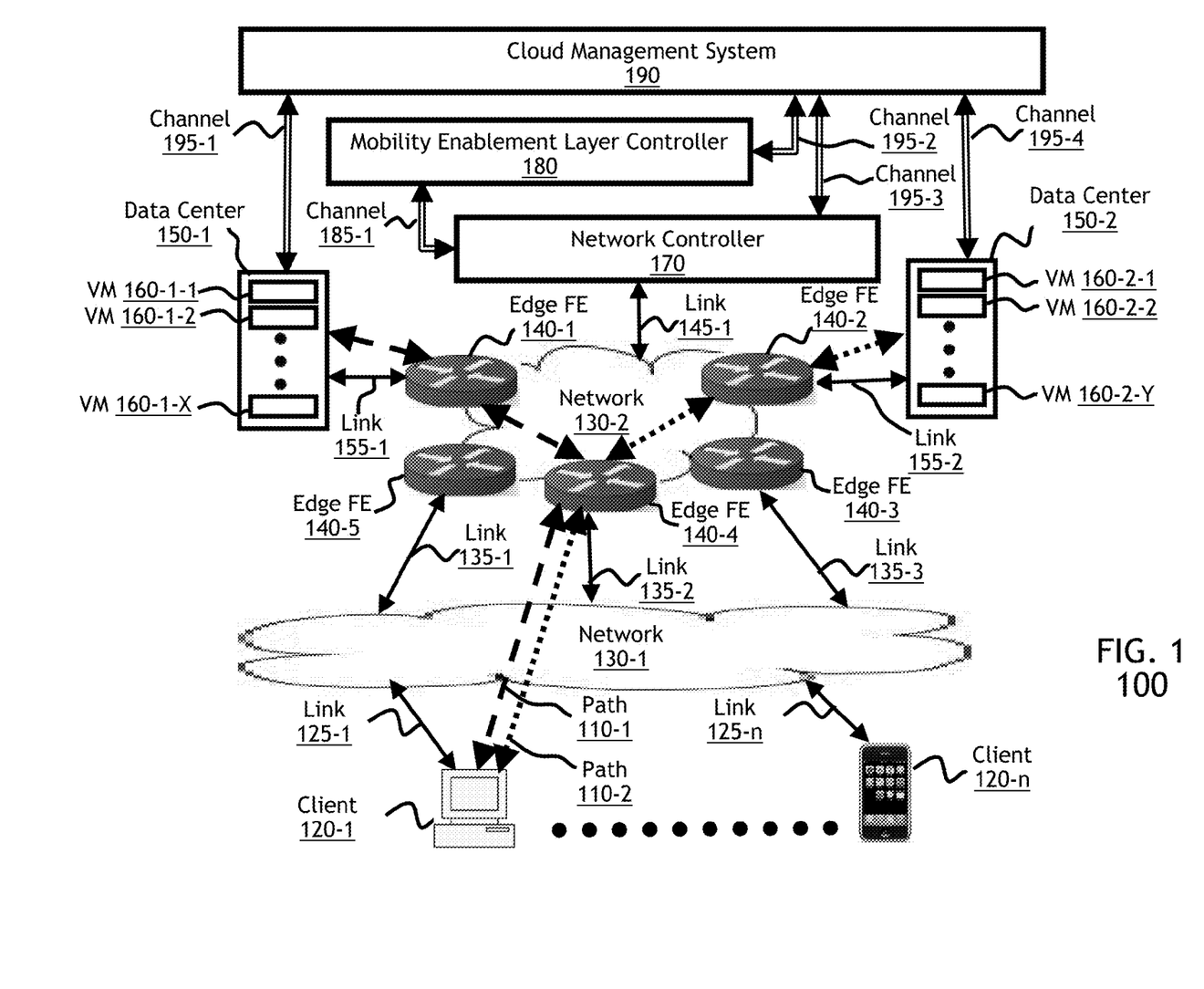
FIG. 1 illustrates a cloud network that includes an embodiment of a migration system 100 for providing migration of a cloud component across IP subnets.

FIG. 1 illustrates a cloud network that includes an embodiment of a migration system 100 for providing migration of a cloud component across IP subnets. The migration system 100 includes one or more clients 120-1-120-n (collectively, clients 120) accessing one or more applications (not shown for clarity) residing in one or more virtual machines VM 160-1-1-VM 160-2-Y (virtual machines 160) in one or more data centers 150-1-150-2 (collectively, data centers 150) over a communication path. The communication path includes an appropriate one of links 125-1-125-n (collectively, links 125), network 130-1, an appropriate one of links 135-1-135-3 (collectively, links 135) connected to an appropriate one of ingress Edge FEs 140-1-140-5 (collectively, edge FEs 140), network 130-2, an appropriate one of egress Edge FEs 140, and an appropriate one of links 155-1-155-2 (collectively, links 155).

Virtual machines providing resources to the application are allocated in one or more of data centers 150 by a cloud management system 190 communicating with the data centers 150 via a communication path such as illustrated by channels 195-1 and 195-4. Migration of one of virtual machines 160 from a first data center (e.g., data center 150-1) to a second data center (e.g., data center 150-2) is initiated by cloud management system 190 communicating with the mobility enablement layer (MEL) controller 180 over a communication channel such as illustrated by channel 195-2. The MEL controller 180 communicates with network controller 170 over a communication channel such as illustrated by channel 185-1 in order to direct the network controller 170 to communicate migration rules to one or more (i.e., a subset) of edge FEs 140. Communication between network controller 170 and one or more of edge FEs 140 are through link 145-1 and network 130-2. It should be appreciated that a subset may contain all of the members of the set (e.g., all of edge FEs 140).

Clients 120 may include any type of communication device(s) capable of sending or receiving information over network 130-1 via one or more of links 125. For example, a communication device may be a thin client, a smart phone (e.g., client 120-n), a personal or laptop computer (e.g., client 120-1), server, network device, tablet, television set-top box, media player or the like. Communication devices may rely on other resources within the exemplary system to perform a portion of tasks, such as processing or storage, or may be capable of independently performing tasks. It should be appreciated that while two clients are illustrated here, system 100 may include fewer or more clients. Moreover, the number of clients at any one time may be dynamic as clients may be added or subtracted from the system at various times during operation.

Links 125, 135, 145-1 and 155 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125, 135, 145-1 and 155 may be any number or combinations of communication channels.

Channels 185-1 and 195-1-195-4 illustrate communication paths between system components and should be broadly construed to include any suitable communication path. For example, a channel may be link as described above, a communication path, or an internal communication channel. Referring to channel 195-4, a communication path may be a link from cloud management system 190 into network 130-2, a path through network 130-2 and link 155-2. Referring to channel 185-1, if MEL controller 180 and network controller 170 reside on the same apparatus, an internal communication channel may be internal processors and memory programmed to pass information between MEL controller 180 and network controller 170.

The network 130-1 and 130-2 include any number of access and edge nodes and network devices and any number and configuration of links. Moreover, it should be appreciated that networks 130-1 and 130-2 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like. Moreover, it should be appreciated that though illustrated as two separate networks, network 130-1 and 130-2 may share all or portions of a network. For example, network 130-2 may reside within network 130-1.

Edge FEs 140 may be any apparatus capable of forwarding requests (e.g., packets) from a source address to a destination address. In particular, edge FEs 140 have at least one flow table which includes forwarding rules that describe how a packet should be routed. It should be appreciated that while five edge FEs 140 are illustrated here, system 100 may include fewer or more edge FEs.

The data centers 150 include one or more virtual machines 160 which reside in an address domain. And address domain may be any suitable address domain such as an IP subnet. Each of virtual machines 160 may include any types or configuration of resources and service any type or number or processes. Resources may be any suitable device utilized by a virtual machine to process requests from clients 120. For example, resources may be: servers, processor cores, memory devices, storage devices, networking devices or the like. In some embodiments, data centers 150 may be geographically distributed. It should be appreciated that while two data centers 150 are illustrated here, system 100 may include more data centers.

Network controller 170 may be any apparatus capable of controlling edge FEs 140. In particular, the network controller 170 updates the flow tables of edge FEs 140 in order to control the forwarding of packets within network 130-2. It should be appreciated that while one network controller 170 is illustrated here, system 100 may include more network controllers.

MEL controller 180 may be any apparatus capable of interfacing between the cloud management system 190 and the network controller 170. In particular, the MEL controller 180 receives notifications of migration events from cloud management system 190, determines forwarding rules for the edge FEs 140 based on the migration event notification and directs network controller 170 to update each of at least a portion of the edge FEs with one or more of the forwarding rules. It should be appreciated that while one MEL controller 180 is illustrated here, system 100 may include more MEL controllers.

Cloud management system 190 may by any apparatus capable of orchestrating the placement of cloud components. As defined herein, a "cloud components" is broadly construed as any individual element controlled by the cloud management system 190 such as an application, a virtual machines or a user end point. In particular, the cloud management system determines when a migration event has occurred and notifies the MEL controller 180 of the migration event. As defined herein, a "migration event" is broadly construed as a determination by the cloud management system 190 that a cloud component is to be migrated from a first location (e.g., data center 150-1) to a second location (e.g., data center 150-2).

In some embodiments, network 130-1 is the internet and network 130-2 is an enterprise or carrier network.

In some embodiments, network 130-2 is a software defined network (SDN) and network controller 170 controls the networking control plane and the edge FEs 140 control the packet forwarding data plane. In some of these embodiments, network controller 170 is an OpenFlow controller.

In some embodiments, network controller 170, MEL controller 180 or cloud management system 190 may reside in the same apparatus/system.

In some embodiments, cloud management system 190 may determine communicate to network controller via channel 195-3. For example, cloud management system 190 may determine that an event has occurred requiring the network controller to remove all forwarding rules (e.g., that the application has been terminated).

Referring to path 110-1 and 110-2, an illustration of an exemplary migration is depicted. In the example, client 120-1 is accessing an application instance residing on a virtual machine in data center 150-1 (e.g., VM 160-1-1) via a communication path 110-1 depicted as the dashed line between client 120-1 and data center 150-1 (e.g., from client 120-1 through network 130-1 to edge FE 140-4, through network 130-2 to edge FE 140-1 and over link 155-1 to data center 150-1).

At some point in time, cloud management system 190 makes a determination that the virtual machine or application instance should be migrated to data center 150-2, and in particular, to a virtual machine on a particular host within data center 150-2 (e.g., VM 160-2-Y). Cloud management system 190 then notifies MEL controller 180 of the migration event.

It should be appreciated that the IP address of the original virtual machine from the IP subnet of data center 150-1 should be maintained in order to ensure the continuation of all client sessions. Furthermore, it should be appreciated that the "new" virtual machine from the IP subnet of data center 150-2 may have a different IP address. It also should be appreciated that the "new" virtual machine (e.g., VM 160-2-Y) may already exist or cloud management system 190 may assign resources and instantiate the virtual machine in response to the migration event. In some embodiments, a hypervisor will request a new IP address from the IP subnet of data center 150-2 (e.g., via DHCP).

MEL controller determines forwarding rules to direct subsequent packets of the application session. In particular, at least some application session packets that are addressed to an IP address within an IP subnet within data center 150-1 are to be directed to an address within an IP subnet in data center 150-2. The MEL controller 180 then directs the network controller to update the edge FEs 140 with the determined forwarding rules.

The network controller 170 updates the flow tables of edge FEs 140 and subsequent packets meeting the forwarding rules shall follow communication path 110-2 depicted as the dotted line between client 120-1 and data center 150-2 (e.g., from client 120-1 through network 130-1 to edge FE 140-4, through network 130-2 to edge FE 140-2 and over link 155-2 to data center 150-2).

Advantageously, the client session is not interrupted during the migration between data centers and no performance delays are introduced because packets are not routed through an anchor node in the original data center 150-1. This may avoid using processing power in data center 150-1 and avoid using transport capacity on links such as link 155-1 connecting data center 150-1 to network 130-2

It should be appreciated that the ingress edge FE may change during the application session. For example, if client 120-n was accessing an application in one of the data centers, the ingress edge FE may start as edge FE 140-3 and then may change to ingress edge FE 140-4 due to a change in location of client 120-n.

Figure 2:
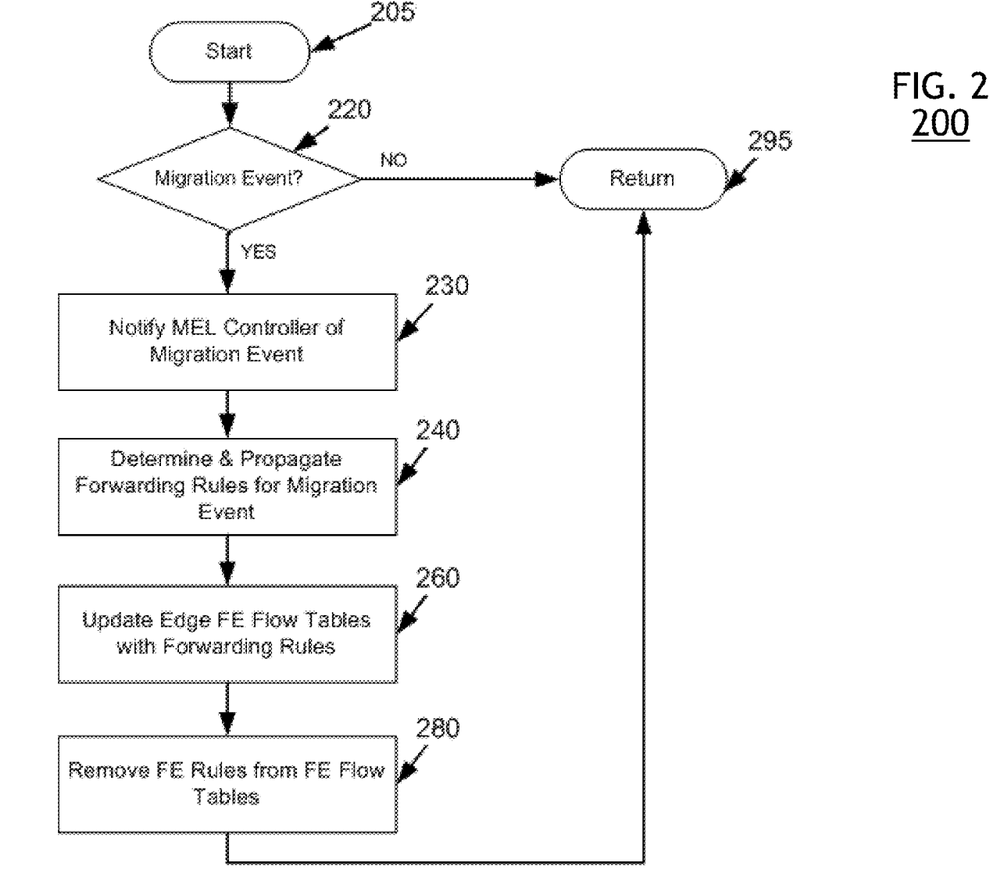
FIG. 2 depicts a flow chart illustrating an embodiment of a method 200 for a migration system (e.g., migration system 100 of FIG. 1) to migrate a cloud component (e.g., one of virtual machines 160 of FIG. 1) from a first data center to a second data center (e.g., data centers 150 of FIG. 1)

FIG. 2 depicts a flow chart illustrating an embodiment of a method 200 for a migration system (e.g., migration system 100 of FIG. 1) to migrate a cloud component (e.g., one of virtual machines 160 of FIG. 1) from a first data center to a second data center (e.g., data centers 150 of FIG. 1). The method includes: determining the occurrence of a migration event (step 220); notifying the MEL controller of the migration event (step 230); determining and propagating forwarding rules for the migration event (step 240); updating edge FE flow tables with the forwarding rules (step 260) and optionally removing the FE rules from the FE flow tables (step 280).

In the method 200, the step 220 includes determining the occurrence of a migration event (e.g., by cloud management system 190 of FIG. 1). In particular, a determination is made that a cloud component (e.g., a virtual machine) is to be migrated from a first data center having a first addressing domain (e.g., IP subnet A) to a second data center having a second addressing domain (e.g., IP subnet B). If a migration event is determined to have occurred, the method proceeds to step 230, else the method proceeds to step 295.

In the method 200, the step 230 includes notifying the MEL controller of the migration event. For example, referring to FIG. 1, the cloud management system 190 notifies the MEL controller 180 via channel 195-2 of the migration event. In particular, the migration event notification includes suitable information for the MEL controller to determine forwarding rules to direct requests (e.g., packets) to and from the first and second address domains through a network (e.g., network 130—of FIG. 1).

In the method 200, the step 240 includes determining and propagating forwarding rules based on the migration event. For example, referring to FIG. 1, the MEL controller 180 determines forwarding rules suitable to direct requests (e.g., packets) to and from the first and second address domains through a network (e.g., network 130—of FIG. 1) and propagates these forwarding rules to network controller 170 via channel 185-1.

In the method 200, the step 260 includes updating the flow tables of the edge FEs with the forwarding rules. For example, referring to FIG. 1, the network controller 170 updates flow tables in edge FEs 140 via link 145-1 and network 130-2.

In the method 200, the method optionally includes the step 280. Step 280 includes removing the forwarding rules from the flow tables in edge FEs 140.

In some embodiments of step 220, a migration event is based on one or more of: (i) service quality estimates; (ii) resource availability; (iii) cost estimates; (iv) proximity of one or more clients to one or more address domains (e.g., proximity of client 120-1 to data center 150-1 and 150-2 in FIG. 1); or (v) the like. Service quality estimates may be based on any suitable parameter such as latency, service quality or the like. Cost estimates may be based on any suitable parameters such as proximity to more cost effective power sources, storage or bandwidth costs or the like.

In some embodiments of step 220 where the migration event is based on proximity of one or more clients (e.g., client 120-1 of FIG. 1) to one of more address domains (e.g., IP subnets in data centers 150-1 and 150-2 of FIG. 1), one or more application instances may be servicing client requests in a first address domain (e.g., an application instance hosted by VM 160-1-1 of FIG. 1) and one or more application instances may be servicing client requests in a second address domain (e.g., an application instance hosted by VM 160-2-Y of FIG. 1). In some of these embodiments, the cloud management system may migrate the application instance servicing the client from the first address domain to the second address domain based on a determination that the client has moved within a threshold distance of the second address domain. The threshold distance may be any suitable parameter such as: (i) the estimated distance between the client and the first address; (ii) the estimated distance between the client and the first domain less a buffer parameter (e.g., an absolute distance value or a fraction of the estimated distance); or (iii) the like. It should be appreciated that the threshold distance may be based on other parameters such as service quality estimates, cost estimates, etc.

In some embodiments of step 230, the migration event notification includes one or more of: (i) an IP address from address domain 1 of the cloud component; (ii) an IP address from address domain 2 of the cloud component; (iii) the migration location, (e.g., the hypervisor responsible for the VM in the second address domain); or (iv) the like.

In some embodiments of the step 280, removal of forwarding rules may be based on one or more of the following: (i) a threshold period of time without receiving a packet meeting the forwarding rule; (ii) an indication that the last client session requiring the forwarding rule has been terminated; (iii) a management event (e.g., to alleviate an overload condition); or (iv) the like.

In some embodiments of the step 280, the removal of forwarding rules from the flow tables in edge FEs 140 is performed by the edge FE associated with the flow table.

Figure 3:
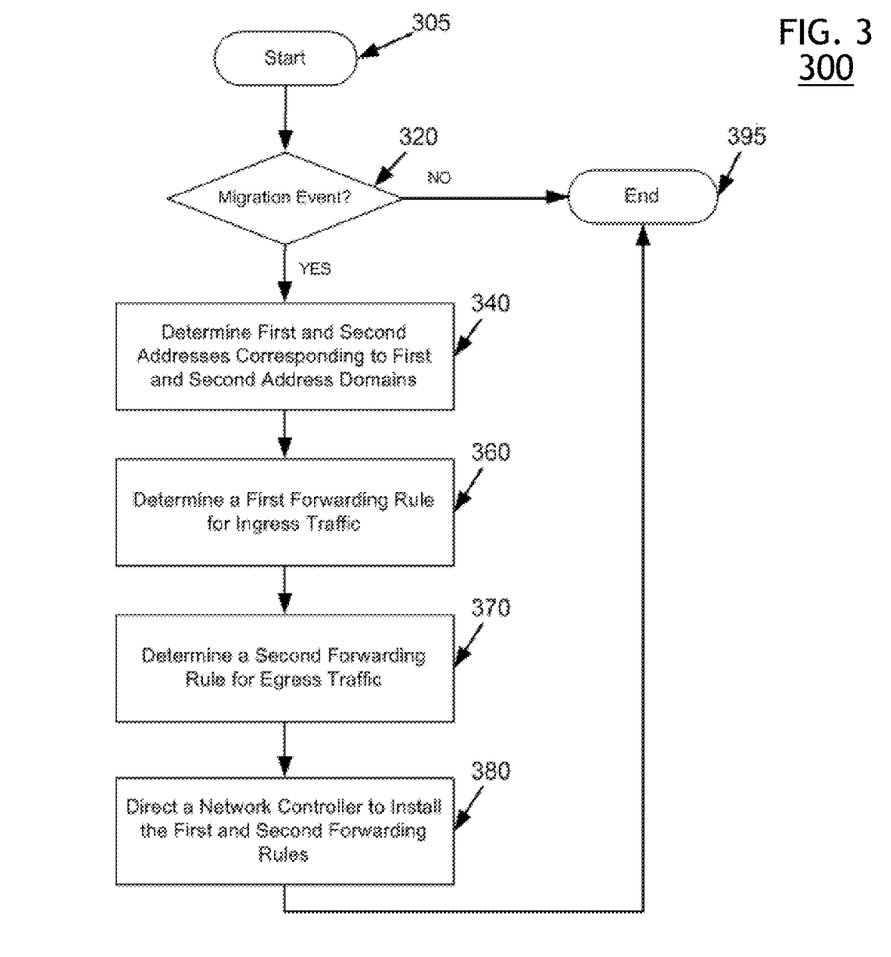
FIG. 3 depicts a flow chart illustrating an embodiment of a method 300 for determining and propagating forwarding rules for a migration event as illustrated in step 240 of FIG. 2.

FIG. 3 depicts a flow chart illustrating an embodiment of a method 300 for determining and propagating forwarding rules for a migration event as illustrated in step 240 of FIG. 2. The method includes: determining that a migration event has occurred (step 320); determining first and second addresses corresponding to first and second address domains (step 340); determining a first forwarding rule for ingress traffic (step 360); determining a second forwarding rule for egress traffic (step 370) and directing a network controller to install the first and second forwarding rules (step 380).

In the method 300, the step 320 includes determining that a migration event has occurred. In particular, a migration event determination may be any suitable indication of a migration event. In some embodiments, step 320 includes receiving a migration event notification from a cloud management system (e.g., the migration event notification of step 230 of FIG. 2). If a migration event is determined to have occurred, the method proceeds to step 340, else the method proceeds to step 395.

In the method 300, the step 340 includes determining first and second addresses corresponding to first and second address domains. In particular, the first address is the old address within the first address domain of the first data center for the cloud component to be migrated and the second address is the new address within the second address domain of the second data center for the migrated cloud component.

In the method 300, the step 360 includes determining a first forwarding rule for ingress traffic. In particular, a forwarding rule is determined for traffic (e.g., packets) received by an edge FE that is addressed to the original cloud component (e.g., virtual machine) being hosted by the original data center. For example, referring to the example above of migration between paths 110-1 and 110-2 of FIG. 1, a first forwarding rule may be to rewrite the destination IP address in packet headers to the IP address of the migrated virtual machine (e.g., VM 160-2-Y) when the destination address is the old IP address of the old virtual machine (e.g., VM 160-1-1) and the source address is from a client (e.g., client 120-1) that was in prior communication with the old virtual machine.

In the method 300, the step 370 includes determining a second forwarding rule for egress traffic. In particular, a forwarding rule is determined for traffic (e.g., packets) received by an edge FE that is addressed to the client from the cloud component (e.g., virtual machine) being hosted by the original data center. For example, referring to the example above of migration between paths 110-1 and 110-2 of FIG. 1, a second forwarding rule may be to rewrite the source IP address in packet headers to the IP address of the original virtual machine (e.g., VM 160-1-1) when the source address is the migrated IP address of the migrated virtual machine (e.g., VM 160-2-Y) and the destination address is from a client (e.g., client 120-1) that was in prior communication with the old virtual machine.

It should be appreciated that clients creating new sessions with the cloud component (e.g., virtual machine) may be given the migrated address and thus, will not required a forwarding rule.

In the method 300, the step 380 includes directing a network controller to install the first and second forwarding rules. The method may direct the network controller using any suitable method such as: (i) pushing a notification to the network controller; (ii) providing information to the network controller when prompted by the network controller; (iii) providing a handshaking protocol (e.g., the apparatus performing the method informs the network controller that one or more forwarding rules are available and the network controller then retrieves the necessary information to install the forwarding rules); or (iv) the like. The network controller may retrieve the information in any suitable way such as: (i) retrieving the information required to install the rules directly from the apparatus performing the method; (ii) retrieving the information from secondary source such as a shared database or shared memory (e.g., if the apparatus performing the method is within the same system as the network controller); (iii) retrieving the information from the cloud management system which has been updated by the apparatus performing the method; or (iv) the like. It should be appreciated that since the network controller controls the edge FEs within the network (e.g., edge FEs 140 within network 130-2), the method may not require identifying the edge FEs to which the first or second forwarding rules should be installed (e.g., have the flow tables updated).

In some embodiments of step 340, the determination of first or second addresses include: (i) receiving an address (e.g., an IP address) for address domain 1 or address domain 2 from the cloud management system (e.g., in the migration event); (ii) retrieving address information from an external source, (e.g., a DNS server or the hypervisor responsible for the VM in the second address domain); or (iii) the like.

In some embodiments of step 360 or 370, a forwarding rule includes a matching rule that causes a source or destination IP address to be rewritten when the matching rule is met. In some of these embodiments, the matching rule contains matching packet header information with one or more of the following matching conditions: (i) a source IP address; (ii) a destination IP address; (iii) a session ID; (iv) an application ID; or (v) the like.

Although primarily depicted and described in a particular sequence, it should be appreciated that the steps shown in methods 200 and 300 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 4:
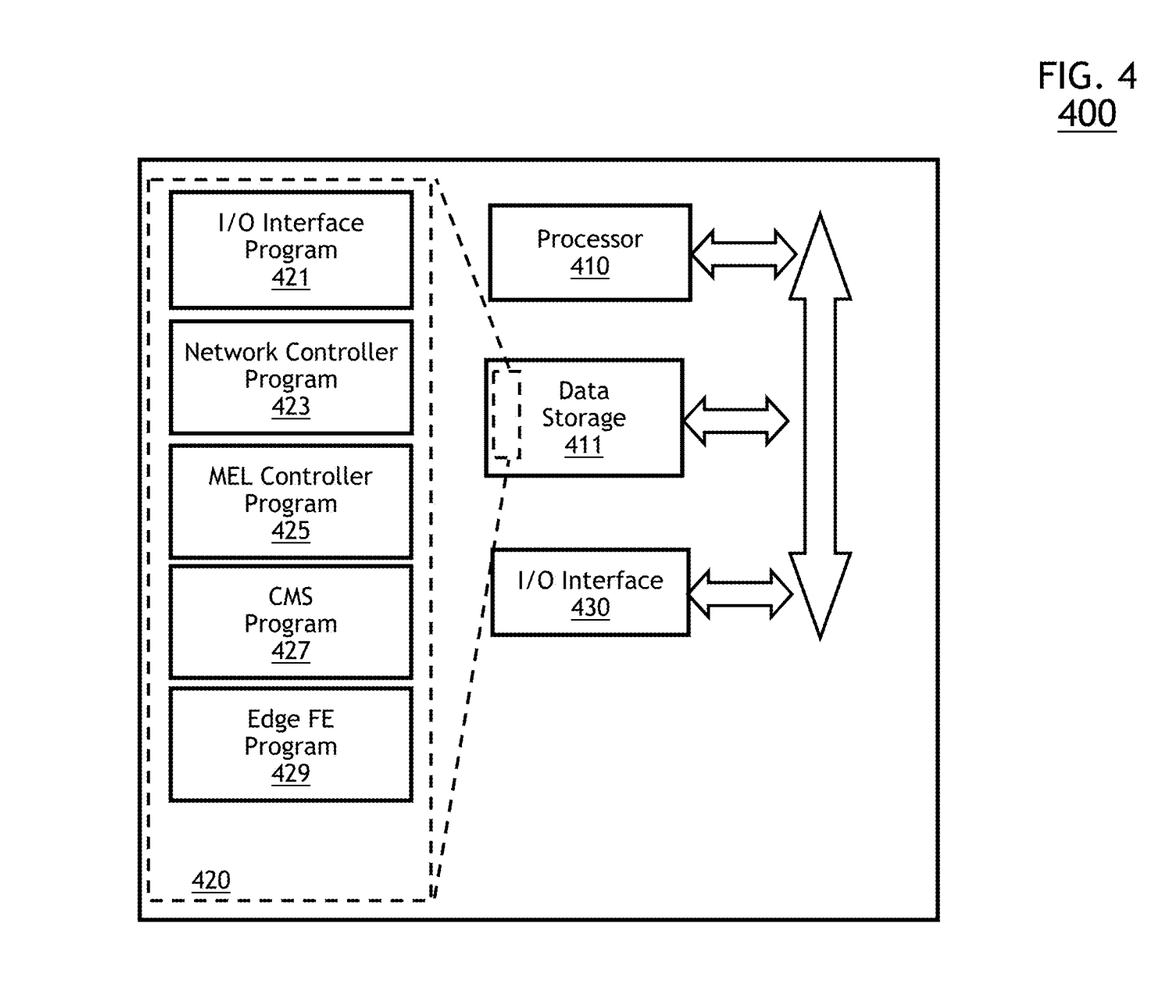
FIG. 4 schematically illustrates an embodiment of various apparatus 400 such as network controller 170, MEL controller 180 or cloud management system 190 of FIG. 1.

FIG. 4 schematically illustrates an embodiment of various apparatus 400 such as network controller 170, MEL controller 180 or cloud management system 190 of FIG. 1. The apparatus 400 includes a processor 410, a data storage 411, and optionally an I/O interface 430.

The processor 410 controls the operation of the apparatus 400. The processor 410 cooperates with the data storage 411.

The data storage 411 stores programs 420 executable by the processor 410. Data storage 411 may also optionally store program data such as flow tables, cloud component assignments, or the like as appropriate.

The processor-executable programs 420 may include an I/O interface program 421, a network controller program 423, a MEL controller program 425, a cloud management system program 427 or an edge FE program. Processor 410 cooperates with processor-executable programs 420.

The I/O interface 430 cooperates with processor 410 and I/O interface program 421 to support communications over links 125, 135, 145-1, 155 and channels 185-1 and 195 of FIG. 1 as described above.

The network controller program 423 performs the steps of step 260 of FIG. 2 as described above.

The MEL controller program 425 performs steps or step 240 of FIG. 2 or method 300 of FIG. 3 as described above.

The cloud management system program 427 performs the steps of steps 220 and 230 of FIG. 2 as described above.

The edge FE program 429 performs the steps of step 280 of FIG. 2 as described above.

In some embodiments, the processor 410 may include resources such as processors/CPU cores, the I/O interface 430 may include any suitable network interfaces, or the data storage 411 may include memory or storage devices. Moreover the apparatus 400 may be any suitable physical hardware configuration such as: one or more server(s), blades consisting of components such as processor, memory, network interfaces or storage devices. In some of these embodiments, the apparatus 400 may include cloud network resources that are remote from each other.

In some embodiments, the apparatus 400 may be virtual machine. In some of these embodiments, the virtual machine may include components from different machines or be geographically dispersed. For example, the data storage 411 and the processor 410 may be in two different physical machines.

When processor-executable programs 420 are implemented on a processor 410, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for migrating a cloud component from a first address domain to a second address domain, the apparatus comprising:
   a data storage; and
   a processor communicatively connected to the data storage, the processor being configured to:
   determine an occurrence of a migration event, the migration event indicating migration of the cloud component from the first address domain to the second address domain;
   determine a first address of the cloud component in the first address domain;
   determine a second address of the cloud component in the second address domain;
   determine a first forwarding rule for ingress traffic based on the first address and the second address;
   determine a second forwarding rule for egress traffic based on the first address and the second address; and
   direct a network controller to install the first and second forwarding rules.

2. The apparatus of claim 1, wherein the first and second address domain are IP subnets.

3. The apparatus of claim 1, wherein the cloud component comprises at least one of an application, a virtual machine or a user endpoint.

4. The apparatus of claim 1, wherein the first forwarding rule specifies rewriting a destination IP address of a first packet with the second address when a matching condition is met.

5. The apparatus of claim 4, wherein the second forwarding rule specifies rewriting a source IP address of a second received packet with the first address when a matching condition is met.

6. The apparatus of claim 1, wherein the determination of the second address comprises configuring the processor to:
   retrieve the second address from an external source.

7. The apparatus of claim 1, wherein the processor is further configured to:
   store at least a portion of the first forwarding rule and at least a portion of the second forwarding rule in a storage accessible to the network controller.

8. A system for migrating a cloud component from a first address domain to a second address domain, the system comprising:
   a cloud management system;
   a MEL controller communicatively connected to the cloud management system; and
   a network controller communicatively connected to the MEL controller;
   wherein the cloud management system is configured to:
   determine a migration event, the migration event comprising a determination to migrate the cloud component from the first address domain to the second address domain; and
   notify the MEL controller of the migration event;
   the MEL controller is configured to:
   determine an occurrence of the migration event;
   determine a first address of the cloud component in the first address domain;
   determine a second address of the cloud component in the second address domain;
   determine a first forwarding rule for ingress traffic based on the first address and the second address;
   determine a second forwarding rule for egress traffic based on the first address and the second address; and
   direct a network controller to install the first and second forwarding rules; and
   the network controller is configured to:
   update flow tables in a plurality of edge FEs based on the first forwarding rule and the second forwarding rule.

9. The system of claim 8, wherein the system is further comprises:
   the plurality of edge FEs communicatively connected to the network controller;
   wherein at least a subset of the plurality of edge FEs are configured to remove the corresponding flow table updates.

10. The system of claim 9, wherein the plurality of edge FEs are edge components in a network, the networking being at least one of an enterprise network or a carrier network.

11. The system of claim 10, wherein the network is a software defined network and the network controller controls the networking control plane and the plurality of edge FEs control the packet forwarding data plane.

12. The system of claim 10, wherein the network controller is an OpenFlow controller.

13. The system of claim 8, wherein the determination of the migration event is based on at least one of: a proximity of a client accessing the cloud component or a determined cost factor.

14. The system of claim 8, wherein the cloud management system is further configured to notify the network controller to modify one or more of the first and second forwarding rules.

15. A method for migrating a cloud component from a first address domain to a second address domain, the method comprising:
   at a processor communicatively connected to a data storage, determining an occurrence of a migration event, the migration event indicating migration of the cloud component from the first address domain to the second address domain;
   determining, by the processor in cooperation with the data storage, a first address of the cloud component in the first address domain;
   determining, by the processor in cooperation with the data storage, a second address of the cloud component in the second address domain;
   determining, by the processor in cooperation with the data storage, a first forwarding rule for ingress traffic based on the first address and the second address;
   determining, by the processor in cooperation with the data storage, a second forwarding rule for egress traffic based on the first address and the second address; and
   directing, by the processor in cooperation with the data storage, a network controller to install the first and second forwarding rules.

16. The method of claim 15, wherein the first and second address domain are IP subnets.

17. The method of claim 15, wherein the cloud component comprises at least one of an application, a virtual machine or a user endpoint.

18. The method of claim 15, wherein the first forwarding rule specifies rewriting a destination IP address of a first packet with the second address when a matching condition is met and the second forwarding rule specifies rewriting a source IP address of a second received packet with the first address when a matching condition is met.

19. The method of claim 15, wherein the step of determining the second address further comprises:
   retrieving, by the processor in cooperation with the data storage, the second address from an external source.

20. The method of claim 15, further comprising:
   storing, by the processor in cooperation with the data storage, at least a portion of the first forwarding rule and at least a portion of the second forwarding rule in a storage accessible to the network controller.

21. A non-transitory computer-readable storage medium storing instructions which, when executed by a computer, cause the computer to perform a method, the method comprising:
   determining an occurrence of a migration event, the migration event indicating migration of the cloud component from the first address domain to the second address domain;
   determining a first address of the cloud component in the first address domain;
   determining a second address of the cloud component in the second address domain;
   determining a first forwarding rule for ingress traffic based on the first address and the second address;
   determining a second forwarding rule for egress traffic based on the first address and the second address; and
   directing a network controller to install the first and second forwarding rules.

22. The non-transitory computer-readable storage medium of claim 21, the method further comprising:
   storing, by the processor in cooperation with the data storage, at least a portion of the first forwarding rule and at least a portion of the second forwarding rule in a storage accessible to the network controller;
   wherein the first forwarding rule specifies rewriting a destination IP address of a first packet with the second address when a matching condition is met and the second forwarding rule specifies rewriting a source IP address of a second received packet with the first address when a matching condition is met.

* * * * *